March 22, 1960   R. T. HALL   2,929,147
CHECKING DEVICE

Filed Oct. 20, 1955   2 Sheets-Sheet 1

INVENTOR.
ROBERT T. HALL.
BY

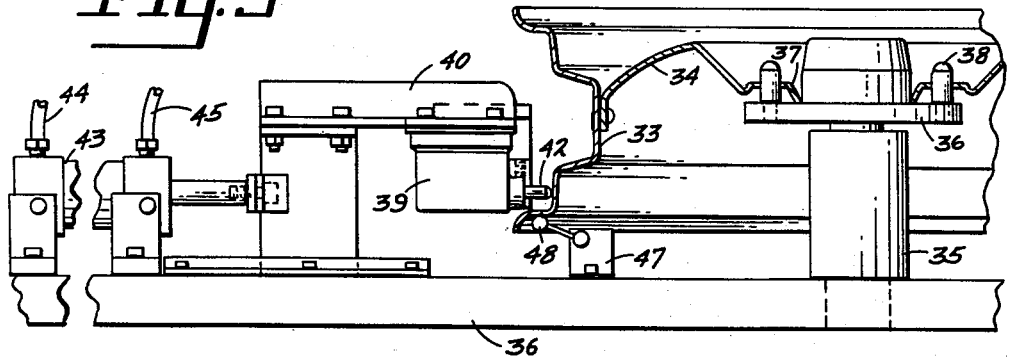
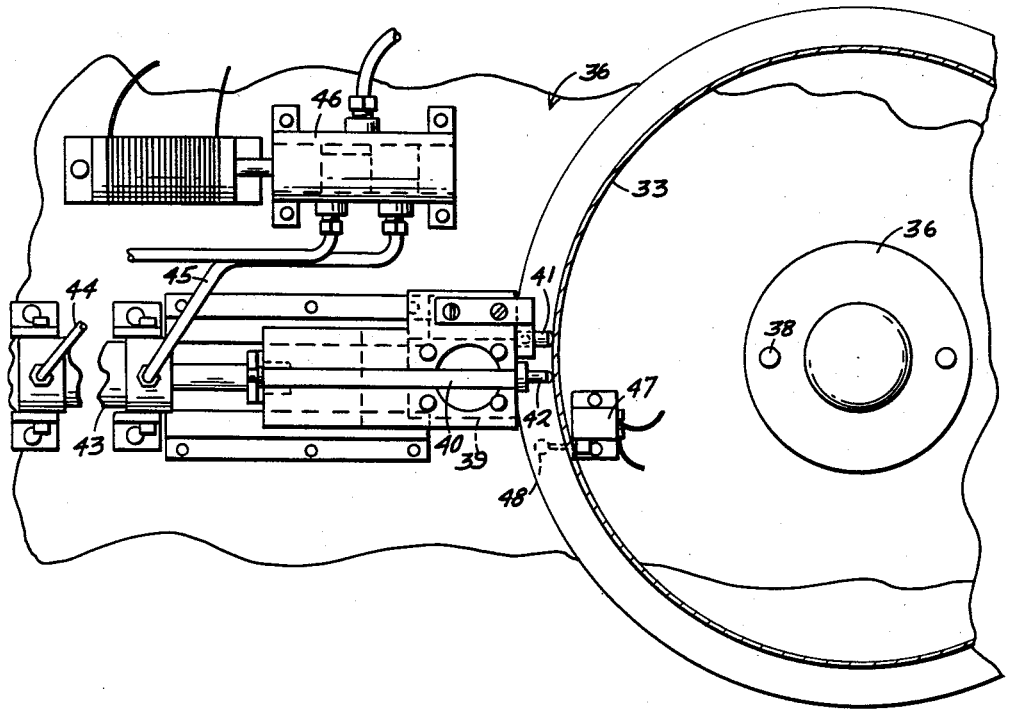

2,929,147

CHECKING DEVICE

Robert T. Hall, Birmingham, Mich., assignor to Kelsey-Hayes Company, a corporation of Delaware Application October 20, 1955, Serial No. 541,625

3 Claims. (Cl. 33—174)

The invention relates to checking devices and refers more particularly to checking devices for indicating variations in dimensions of spaced portions of a surface of an article. More specifically, the invention has reference to checking devices for indicating unevenness or wave of circumferentially spaced portions of an annular surface of an article.

The invention has for one of its objects to provide a checking device having relatively movable contact members which are simultaneously engageable with spaced portions of an article and are operable to control the operation of the checking device to indicate the relative positions of the contact members and thereby indicate variations in the surface being checked of the article.

The invention has for other objects to provide a checking device having means for moving the contact members out of engagement with the article to permit its removal and the insertion of another article and to provide a checking device having means for yieldably moving and holding the contact members against the article.

These and other objects of the invention will become apparent from the following description taken in connection with the accompanying drawings in which—

Figure 3 is a view similar to Figure 1 showing a modification;

Figure 4 is a plan view of Figure 3.

Figure 2:
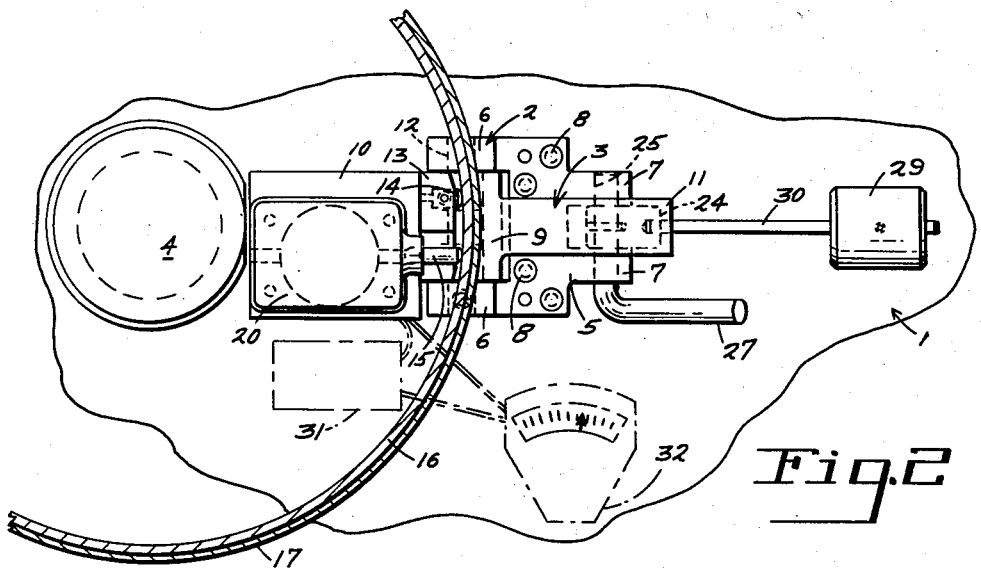
Figure 2 is a plan view of the checking device with the article broken away and in section and with diagrammatic illustration of various elements used in connection with the checking device.

The checking device has the base 1, the support 2 and the carrier 3. The base 1 has mounted thereon the upright pilot 4. The support 2 has the body 5 and the end furcations 6 and 7 and the support is fixedly secured to the upper surface of the base 1 by the screws 8 extending through the body 5 into the base 1. The carrier 3 has the body 9 and the lower and upper end arms 10 and 11, respectively, the body 9 extending between the end furcations 6 and being journalled on the pivot pin 12 which extends through the body 9 and the furcations 6. The body is formed with the upwardly extending flange 13 in which is fixedly mounted the contact member 14 having a convex partly spherical end engageable with the surface being checked of the article. The lower end arm 10 extends beyond the end furcations 6 and the upper end arm 11 extends above the end furcations 7. The lower end arm has movably mounted thereon the contact member 15 extending adjacent the contact member 14 and also having a convex partly spherical end engageable with the article surface being checked. In the present instance, the article is a brake drum having the annular centrifugally cast liner 16 inside and fused to the annular flange 17 of the shell 18. The contact members 14 and 15 are located to engage circumferentially spaced portions of the radially inner braking surface of the liner at a predetermined distance from each other. The predetermined distance is a minor portion of the circumference of the braking surface, so that the device does not check or indicate the run-out or eccentricity of the braking surface as a whole. The contact member 15 is mounted on the reciprocable gaging spindle 19 of the gage head 20 which is fixedly secured to the upper surface of the lower end arm 10 of the carrier 3.

The upright pilot 4 has the reduced upper end portion 21 of a size to extend through and fit the central hole in the web 22 of the brake drum shell. This pilot also has the annular shoulder 23 for engaging the portion of the web immediately surrounding the central hole so that the brake drum is rotatably supported. The pilot is also positioned such that the liner 16 of the brake drum is in position to be engaged by the contact members 14 and 15.

For the purpose of moving the contact members 14 and 15 out of engagement with the liner 16 of the brake drum to permit the removal of the brake drum and the insertion of another brake drum, I have provided the cam 24 extending between the end furcations 7 and fixedly secured to the shaft 25 by the pin 26. The shaft extends between the end furcations 7 and is journalled therein and preferably has integral with one end thereof the transversely extending handle portion 27 by means of which the cam can be rotated in a counterclockwise direction to lift the upper end arm 11 and thereby swing the carrier 3 in a counterclockwise direction to move the contact members 14 and 15 inwardly and downwardly away from the liner 16. The cam preferably has the flat surface 28 which, when in engagement with the upper end arm, will hold the cam in adjusted position.

In order to yieldably move the contact members 14 and 15 into engagement with the liner 16, there is the weight 29 adjustably secured on the rod 30 which in turn is threadedly secured in the end of the upper arm 11 beyond the cam 24. The cam is so shaped that when the cam is being rotated in a clockwise direction to the position shown in Figure 1, it allows the weight to swing the carrier in a clockwise direction and move the contact members 14 and 15 into engagement with the liner 16.

The gage head 20 is electrically connected to the power unit 31 which in turn is electrically connected to the meter 32. The power unit and meter may be mounted in any desired position and, as shown, they are mounted on the base 1. The gage head, power unit and meter are standard or conventional elements of a comparator engineered and produced by a well-known manufacturing concern in the United States.

As shown in Figures 3 and 4, the checking device is for use in indicating dimensional variation or run-out of spaced circumferential portions of an annular surface, such as a tire bead seat of a tire rim 33. The rim is fixedly secured to the wheel body 34 of a motor vehicle wheel which is mounted on the pilot 35 rotatably mounted on the base or table 36. As shown, the bolt holes in the mounting flange 37 of the wheel body or at least certain of these bolt holes are engageable with the upright dowel pins 38 carried by the pilot.

Figure 1:
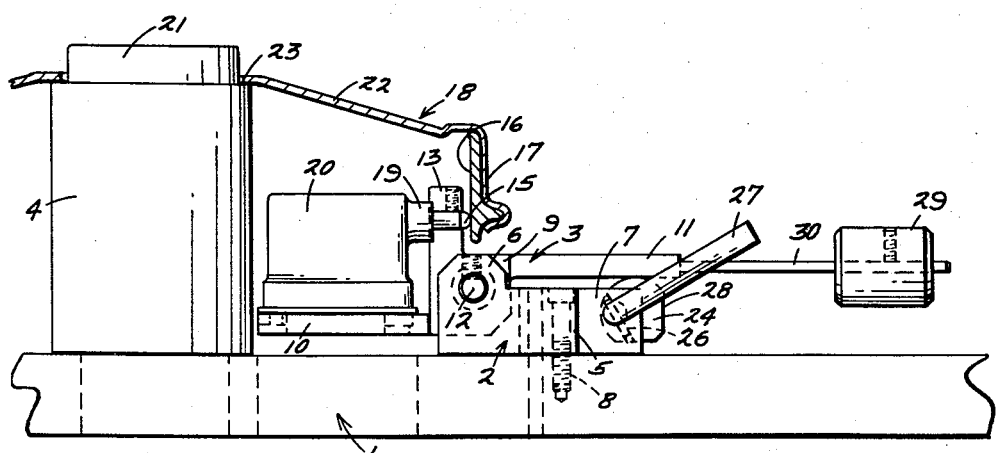
Figure 1 is a side elevation of a checking device embodying the invention.

The checking device has the same elements as illustrated in Figures 1 and 2 with the gage head 39 mounted on the carrier 40 which is a slide movable radially with respect to the wheel and directly carrying the fixed contact member 41 corresponding to the contact member 14. The movable contact member 42 is directly mounted on the gage head 39 in the same manner as the contact member 15 is mounted on its gage head. The slide in the present instance is mounted on a portion of the base which forms the support for the slide and is adapted to be moved radially by means of the air cylinder 43 having ports at its opposite ends connected by the tubes 44 and 45 to a solenoid operated valve 46, the solenoid of which is electrically connected to the limit switch 47. The solenoid operated valve and the limit switch are mounted on the base or table 36 with the limit switch located so that its contact arm 48 is engageable by the lower tire retaining flange of the rim during the final downward movement of the wheel body when being mounted on the pilot.

The invention affords a device for checking dimensional variation or unevenness, in the radial sense, of surface portions of an annular object which are very closely spaced circumferentially thereof, in relation to or by comparison with the total circumference or circumferential extent of the checked surface. Rather than a check of overall run-out or eccentricity of the checked surface as a whole, applicant's device makes possible the taking of an infinite number of readings, each on the basis of a spacing of feeler elements of, say, one inch, about the periphery of an object such as an automotive brake drum or wheel rim of vastly greater peripheral extent. Overall unevenness, eccentricity or run-out is ignored.

What I claim as my invention is:

1. In a checking device for indicating variation in radial dimensions of circumferentially spaced portions of an annular surface of an annular article, a support for supporting the article for rotation about a fixed axis, a carrier, means guiding said carrier for movement toward and away from said fixed axis, said carrier having a single fixed portion in position to engage said surface of the article on said support, said single fixed portion being the only fixed portion of said carrier engageable with said surface of the article on said support and being in the form of a contact member shaped to have point contact with said surface of the article, a second contact member mounted on said carrier for movement in the direction of carrier movement, said second contact member being positioned to engage said surface of the article on said support and being shaped to have point contact therewith, said contact members being closely spaced apart circumferentially with respect to said fixed axis for simultaneous engagement with closely circumferentially spaced portions of said surface of the article on said support, means for urging said carrier in one direction relative to said fixed axis to maintain said contact members in continuous engagement with the said surface during rotation of the article, and gage means operated by movement of said second contact member relative to said carrier.

2. In a checking device for indicating variation in radial dimensions of circumferentially spaced portions of an annular surface of an annular article, a base having means for supporting the article for rotation about a fixed axis, a carrier, means mounting said carrier on said base for guided movement toward and away from said fixed axis, said carrier having a single fixed portion in position to engage said surface of the article on said support, said single fixed portion being the only fixed portion of said carrier engageable with said surface of the article on said support and being in the form of a contact member shaped to have point contact with said surface of the article, a second contact member mounted on said carrier for movement in the direction of carrier movement, said second contact member being positioned to engage said surface of the article on said support and being shaped to have point contact therewith, said contact members being closely spaced apart circumferentially with respect to said fixed axis for simultaneous engagement with closely circumferentially spaced portions of said surface of the article on said base, fluid pressure means for yieldably urging said carrier in one direction relative to said fixed axis to maintain said contact members in continuous engagement with said surface during rotation of the article, and gage means operated by movement of said second contact member relative to said carrier.

3. In a checking device for indicating variation in radial dimensions of circumferentially spaced portions of an annular surface of an annular article, a base having means for supporting the article for rotation about a fixed axis, a carrier, means pivotally mounting said carrier on said base for movement toward and away from said fixed axis, said carrier having a single fixed portion in position to engage said surface of the article on said support, said single fixed portion being the only fixed portion of said carrier engageable with said surface of the article on said support and being in the form of a contact member shaped to have point contact with said surface of the article, a second contact member mounted on said carrier for movement in the direction of carrier movement, said second contact member being positioned to engage said surface of the article on said support and being shaped to have point contact therewith, said contact members being closely spaced apart circumferentially with respect to said fixed axis for simultaneous engagement with closely circumferentially spaced portions of said surface of the article on said base, a weight for normally swinging said carrier relative to its pivotal mounting in one direction relative to said fixed axis to engage said contact members with said surface and to yieldably maintain said contact members in continuous engagement with said surface during rotation of the article, a cam for swinging said carrier in the opposite direction relative to its pivotal mounting to move said contact members away from the article and out of engagement with the surface thereof, and gage means operated by movement of said second contact member relative to said carrier.

References Cited in the file of this patent

UNITED STATES PATENTS

| Number | Name | Date |
| --- | --- | --- |
| 703,725 | Hardinge | July 1, 1902 |
| 802,470 | Picard | Oct. 24, 1905 |
| 812,042 | Hudson | Feb. 6, 1906 |
| 1,317,459 | Rouanet | Sept. 30, 1919 |
| 1,539,896 | Claybourn | June 2, 1925 |
| 1,997,639 | Hetherington | Apr. 16, 1935 |
| 2,016,420 | Engst | Oct. 8, 1935 |
| 2,420,711 | Look | May 20, 1947 |
| 2,427,152 | Moore | Sept. 9, 1947 |
| 2,487,628 | Aller | Nov. 8, 1949 |
| 2,613,447 | Brouwer | Oct. 14, 1952 |
| 2,624,949 | Schieman | Jan. 13, 1953 |
| 2,648,135 | Gates | Aug. 11, 1953 |
| 2,657,468 | Lyons | Nov. 3, 1953 |
| 2,662,297 | Reicherter | Dec. 15, 1953 |